(12) United States Patent
Chen

(10) Patent No.: US 12,422,904 B2
(45) Date of Patent: Sep. 23, 2025

(54) GRAPHICS CARD LIFTING DEVICE

(71) Applicant: Chien-Hao Chen, Keelung (TW)

(72) Inventor: Chien-Hao Chen, Keelung (TW)

( * ) Notice: Subject to any disclaimer, the term of this patent is extended or adjusted under 35 U.S.C. 154(b) by 238 days.

(21) Appl. No.: 18/318,988

(22) Filed: May 17, 2023

(65) Prior Publication Data

US 2024/0302875 A1 Sep. 12, 2024

(30) Foreign Application Priority Data

Mar. 8, 2023 (TW) ................. 112202017

(51) Int. Cl.
*G06F 1/18* (2006.01)

(52) U.S. Cl.
CPC .................. *G06F 1/185* (2013.01)

(58) Field of Classification Search
CPC ........... G06F 1/185; G06F 1/186; G06F 1/183
See application file for complete search history.

(56) References Cited

U.S. PATENT DOCUMENTS

| 6,752,276 B2* | 6/2004 | Rumney | H05K 7/142 |
| | | | 361/801 |
| 12,174,675 B2* | 12/2024 | Xu | G06F 1/185 |

FOREIGN PATENT DOCUMENTS

KR 20170083880 A * 7/2017

* cited by examiner

*Primary Examiner* — James Wu
(74) *Attorney, Agent, or Firm* — MUNCY, GEISSLER, OLDS & LOWE P.C.

(57) ABSTRACT

A graphics card lifting device comprises an elongated lifting member having a front end and a rear end. A groove track is provided between the two ends. A first portion and a second portion are provided at the front end and the rear end of the elongated lifting member respectively. The second portion is movable along the groove track. When one end of a graphics card is disposed between the front end and the rear end, a spacing between the front end and the rear end is adjusted, so that the one end of the graphics card is supported by the first portion and the second portion.

5 Claims, 4 Drawing Sheets

GRAPHICS CARD LIFTING DEVICE

FIELD OF THE INVENTION

The present invention is related to a graphics card lifting device with a simple structure that can stably lift the graphics card, especially suitable for users of the graphics card.

BACKGROUND OF THE INVENTION

In recent years, the development of computer devices is changing very rapidly over times. With the evolution of the times, the application of computer devices can be seen everywhere, and it has become what is called a computer today. Computers have a variety of execution and calculation functions, which can meet people's needs. For example, personal computers have functions such as entertainment, document processing, and video playback in family life. Industrial computers provide control, supervision and computing services for factory operations. And automotive computers provide drivers and passengers with multimedia entertainment and real-time information reception. On the whole, computers have become an indispensable part of human social life.

In addition, with the continuous innovation of computer graphics and graphics processing technology, the demand for computer calculations is also increasing, so the current graphics card usually has an independent graphics processing unit chip. With the enhancement of functions, the amount of computation borne by the graphics card is also increasing; correspondingly, the capacity and heat dissipation requirements of the graphics card are also greatly increased, which makes the size and weight of the graphics card larger and larger. Therefore, in assembly, simply using the conventional fixing method (one end of the graphics card is plugged into the mainboard card slot, and the other end is locked to the computer case), it is still impossible to avoid the problem of damage or loosening of the locking part due to vibration.

SUMMARY OF THE INVENTION

In view of this, in order to provide a structure different from the conventional technology and improve the fixing strength of the graphics card in the computer case, the applicant has accumulated many years of experience and continuous research and development, so the present invention has been invented.

The main object of the present invention is to provide a graphics card lifting device with a simple structure that can stably lift the graphics card.

In order to solve the above described problems and to achieve the expected effect, the present invention provides a graphics card lifting device which comprises an elongated lifting member. The elongated lifting member has a front end and a rear end. A groove track is provided between the front end and the rear end of the elongated lifting member. A first portion is provided at the front end of the elongated lifting member. A second portion is provided above the groove track near the rear end of the elongated lifting member. The second portion is movable along the groove track. When one end of a graphics card is disposed between the front end and the rear end, a spacing between the front end and the rear end is capable of being adjusted, so that the one end of the graphics card is supported by the first portion and the second portion.

In implementation, two fixing portions are provided at the front end and the rear end of the elongated lifting member respectively. The front end and the rear end of the elongated lifting member are fixed to a computer motherboard by the two fixing portions respectively.

In implementation, two fixing holes are provided at the two fixing portions respectively for locking and fixing the front end and the rear end of the elongated lifting member to the computer motherboard respectively.

In implementation, a plurality of through holes is provided beside one side of the groove track and spaced from each other. The second portion includes a fixing member and an elastic buckling device. The fixing member of the second portion is arranged in the groove track, so that the second portion is capable of being sliding along the groove track. The elastic buckling device includes a pressing portion and a protruding column. When the pressing portion is pressed, the protruding column is contracted into the second portion. When the pressing portion is released, the protruding column is restored and passes through one of the plurality of through holes, so that the second portion is positioned on the groove track.

In implementation, the graphics card lifting device further comprises a fixing plate disposed below the groove track. The second portion is fixed on the elongated lifting member by passing a screw through a hole of the fixing plate and screwing into a screw hole of the fixing member.

For further understanding the characteristics and effects of the present invention, some preferred embodiments referred to drawings are in detail described as follows.

DETAILED DESCRIPTIONS OF PREFERRED EMBODIMENTS

Figure 1:
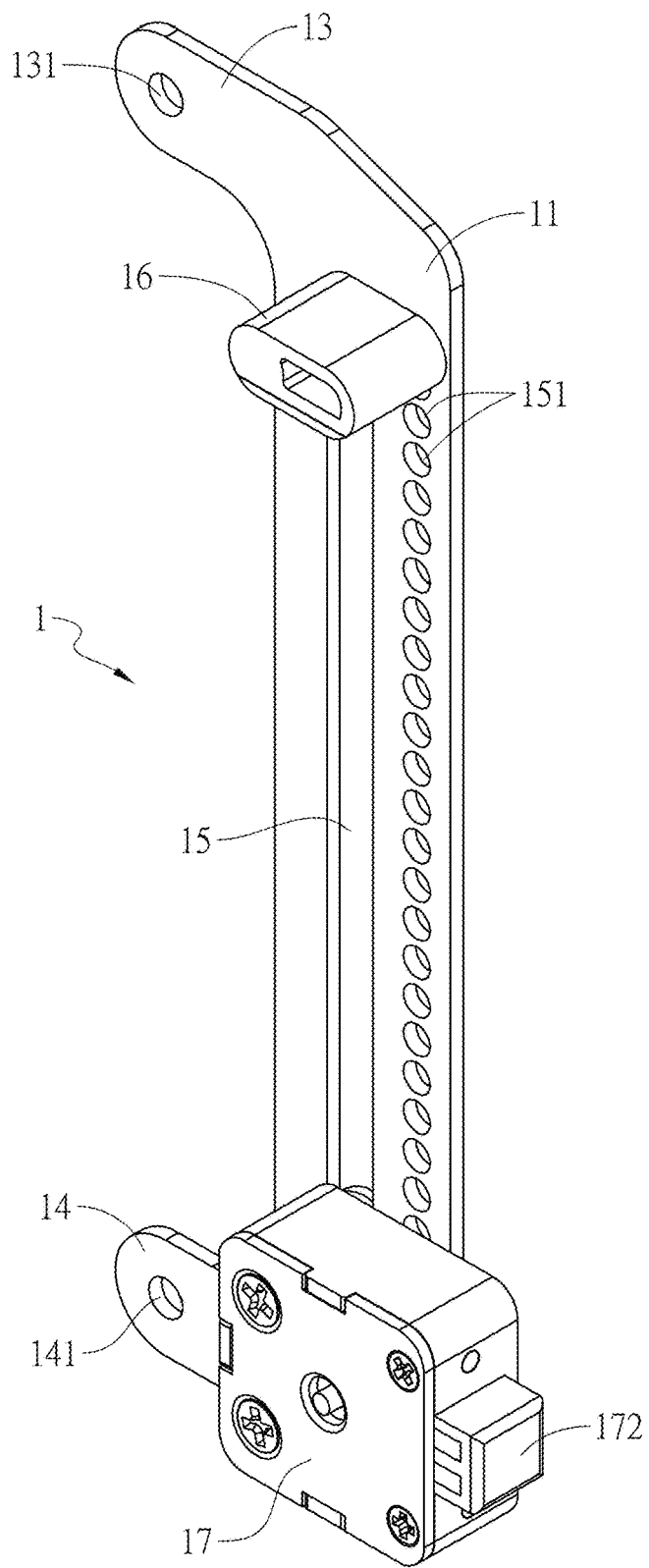
FIG. 1 is a schematic perspective view of an embodiment of a graphics card lifting device of the present invention.

Please refer to FIGS. 1-4, which show a preferred embodiment of a graphics card lifting device of the present invention.

The present invention provides a graphics card lifting device, which comprises an elongated lifting member 1 having a front end 11 and a rear end 12. Two fixing portions 13, 14 are provided at the front end 11 and the rear end 12 of the elongated lifting member 1 respectively. The front end 11 and the rear end 12 of the elongated lifting member 1 are fixed to a computer motherboard 2 by the two fixing portions 13, 14. Two fixing holes 131, 141 are provided at the two fixing portions 13, 14 respectively for locking and fixing the front end 11 and the rear end 12 of the elongated lifting member 1 to the computer motherboard 2 respectively.

A groove track 15 is provided between the front end 11 and the rear end 12 of the elongated lifting member 1. A first portion 16 is provided and fixed at the front end 11 of the elongated lifting member 1. A second portion 17 is provided above the groove track 15 near the rear end 12 of the elongated lifting member 1, and the second portion 17 is movable along the groove track 15. When one end of a graphics card 3 is disposed between the first portion 16 and the second portion 17, a spacing between the first portion 16 and the second portion 17 is capable of being adjusted, so that the one end of the graphics card 3 is supported by the first portion 16 and the second portion 17.

Figure 2:
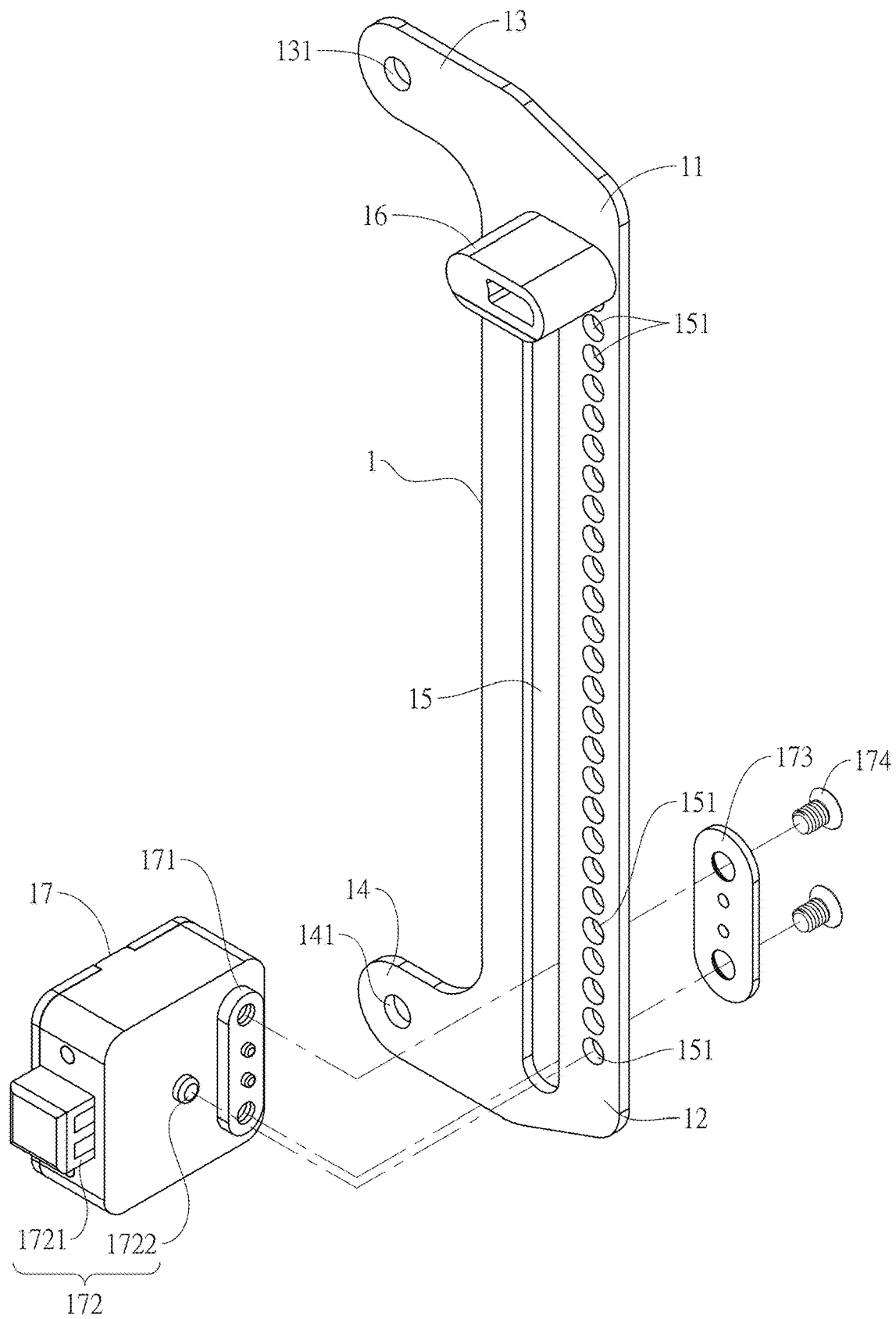
FIG. 2 is a perspective exploded view of an embodiment of a graphics card lifting device of the present invention.

A plurality of through holes 151 is provided beside one side of the groove track 15 and spaced from each other. The second portion 17 includes a fixing member 171 and an elastic buckling device 172. The fixing member 171 of the second portion 17 is arranged in the groove track 15, so that the second portion 17 is capable of being sliding along the groove track 15 (as shown in FIGS. 1 and 2). The elastic buckling device 172 includes a pressing portion 1721 and a protruding column 1722. When the pressing portion 1721 is pressed, the protruding column 1722 is contracted into the second portion 17. When the pressing portion 1721 is released, the protruding column 1722 is restored and passes through one of the through holes 151, so that the second portion 17 is positioned above the groove track 15.

Figure 3:
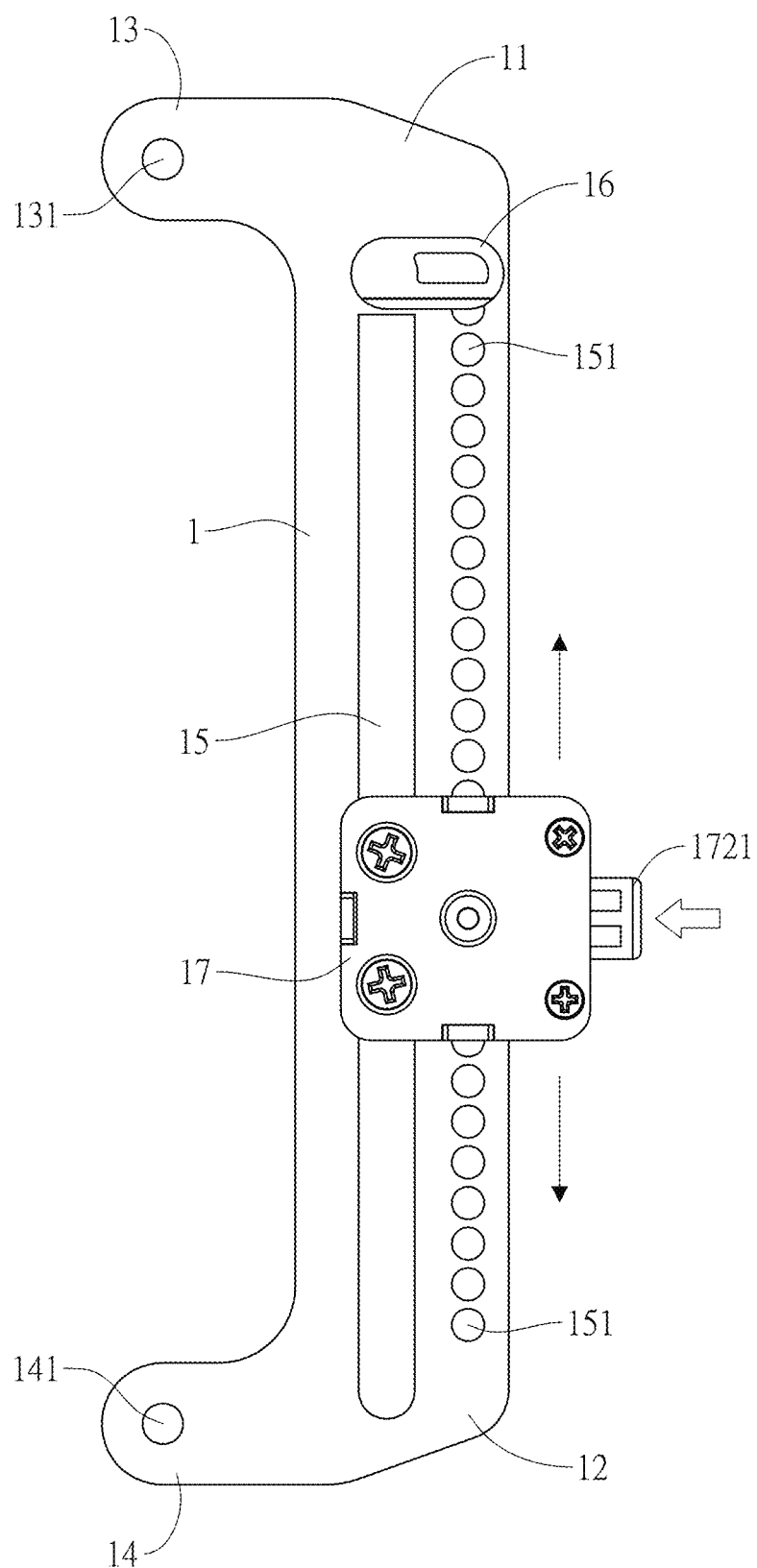
FIG. 3 is a schematic view of an embodiment of a graphics card lifting device of the present invention when moving a second portion.
Figure 4:
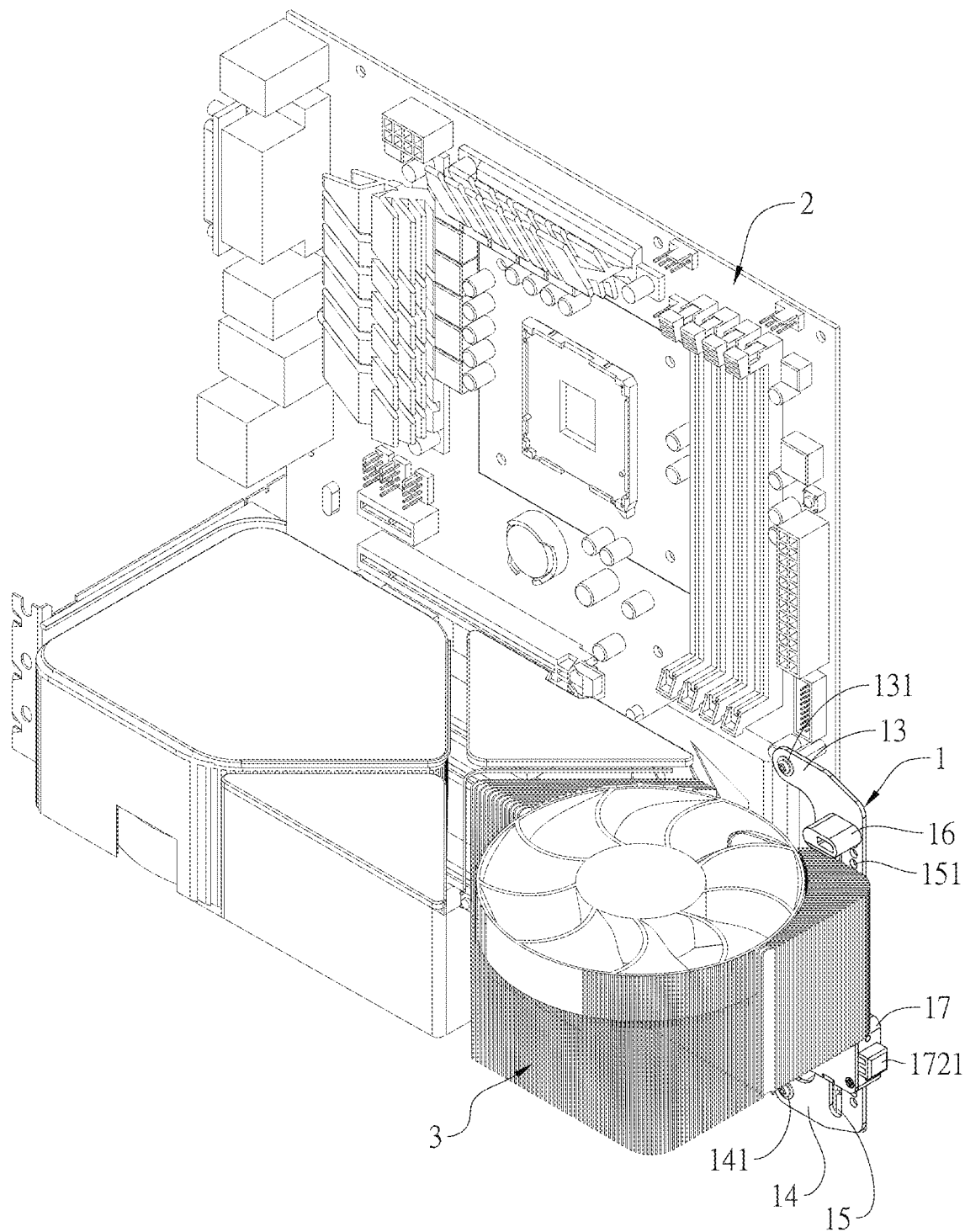
FIG. 4 is a schematic view of an embodiment of a graphics card lifting device of the present invention in a state of use.

Therefore, as shown in FIGS. 2-4, when the front end 11 and the rear end 12 of the elongated lifting member 1 are locked and fixed to the computer motherboard 2 by the two fixing holes 131, 141, one end of a graphics card 3 is disposed between the first portion 16 and the second portion 17. When pressing the pressing portion 1721 of the second portion 17, the protruding column 1722 is contracted into the second portion 17, so that the second portion 17 is capable of being sliding along the groove track 15 to adjust a spacing between the first portion 16 and the second portion 17. Till the spacing is properly adjusted, the one end of the graphics card 3 is stably supported by the first portion 16 and the second portion 17, then releasing the pressing portion 1721, the protruding column 1722 is restored and passes through one of the through holes 151, so that the second portion 17 is positioned above the groove track 15. Similarly, when replacing the graphics card 3, the user just simply need to press the pressing portion 1721 of the second portion 17, the protruding column 1722 is contracted into the second portion 17, moving the second portion 17, so that the spacing between the first portion 16 and the second portion 17 is widened, then the graphics card 3 is capable of being replaced.

Furthermore, as shown in FIG. 2, the graphics card lifting device further comprises a fixing plate 173 disposed below the groove track 15. The second portion 17 is fixed on the elongated lifting member 1 by passing two screws 174 through two holes of the fixing plate 173 and screwing into two screw holes of the fixing member 171.

Thus, through the above described design, the present invention has the following advantages:
1. The graphics card lifting device of the present invention has a simple structure and low in cost, and can be easily assembled on the motherboard by using the holes reserved on the motherboard, so that the stability of the graphics card can be maintained even when the vibration is generated when the computer is turned on or when it is transported.
2. The graphics card lifting device of the present invention can adjust the position according to the size of the graphics card, and is suitable for the use of any graphics card on the market.
3. The present invention adopts the elastic buckling design. After the graphics card lifting device is assembled, the distance between the ends can be adjusted simply by manual pressing. There is no need to use tools to adjust or disassemble it, which is very fast and convenient.

As disclosed in the above description and attached drawings, the present invention can provide a graphics card lifting device. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A graphics card lifting device comprising:
an elongated lifting member having a front end and a rear end, a groove track is provided between said front end and said rear end of said elongated lifting member, a first portion is provided at said front end of said elongated lifting member, a second portion is provided above said groove track near said rear end of said elongated lifting member, and said second portion is movable along said groove track; when one end of a graphics card is disposed between said first portion and said second portion, a spacing between said first portion and said second portion is adjusted, so that said one end of said graphics card is supported by said first portion and said second portion.

2. The graphics card lifting device according to claim 1, wherein two fixing portions are provided at said front end and said rear end of said elongated lifting member respectively to fix said front end and said rear end of said elongated lifting member to a computer motherboard by said two fixing portions respectively.

3. The graphics card lifting device according to claim 2, wherein two fixing holes are provided at said two fixing portions respectively for locking and fixing said front end and said rear end of said elongated lifting member to said computer motherboard respectively.

4. The graphics card lifting device according to claim 1, wherein a plurality of through holes is provided beside one side of said groove track and spaced from each other, said second portion includes a fixing member and an elastic buckling device, said fixing member of said second portion is arranged in said groove track, so that said second portion is capable of being sliding along said groove track, and said elastic buckling device includes a pressing portion and a protruding column, when said pressing portion is pressed, said protruding column is contracted into said second portion, when said pressing portion is released, said protruding column is restored and passes through one of said plurality of through holes, so that said second portion is positioned on said groove track.

5. The graphics card lifting device according to claim 4, further comprising a fixing plate disposed below said groove track, said second portion is fixed on said elongated lifting member by passing a screw through a hole of said fixing plate and screwing into a screw hole of said fixing member.

* * * * *